Sept. 27, 1932.  L. E. GREENE  1,879,196
GEAR CUTTING APPARATUS
Filed March 12, 1930
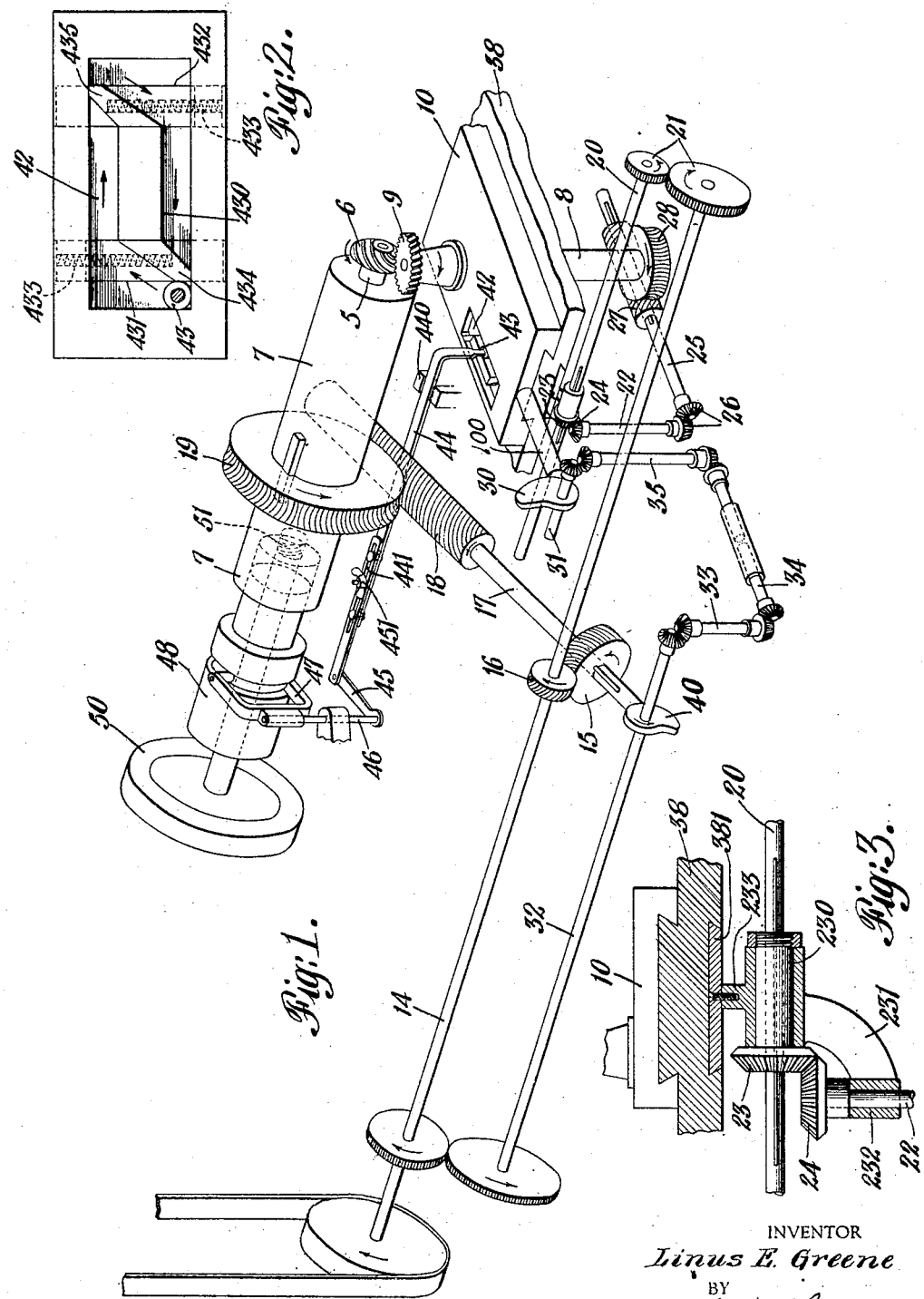
INVENTOR
*Linus E. Greene*
BY
*H. C. Liesering*
ATTORNEY Patented Sept. 27, 1932

1,879,196

UNITED STATES PATENT OFFICE

LINUS E. GREENE, OF FITCHBURG, MASSACHUSETTS, ASSIGNOR TO MANNING, MAXWELL & MOORE, INC., OF NEW YORK, N. Y., A CORPORATION OF NEW JERSEY

GEAR CUTTING APPARATUS

Application filed March 12, 1930. Serial No. 435,145.

The present invention has for an object to provide an improved gear cutting machine. This is a continuation in part of my co-pending application, Ser. No. 367,303, filed on May 31, 1929.

The invention has been evolved in connection with the development of a machine for cutting spiral bevel gears and for convenience of disclosure this embodiment of the invention will be more particularly described to illustrate the principles of the invention, although it should be understood that these principles are applicable to machines of other types as well.

The illustrative machine operates by a repeated relative reciprocating movement of the cutter across the face of the blank somewhat in the manner of the Fellow's shaper but preferably the gear blank and cutter rotate continuously during the reciprocating movement.

The nature and objects of the invention will be better understood from a description of a particular illustrative embodiment thereof for the purpose of which description reference should be had to the accompanying drawing forming a part hereof and in which:

Figure 1 is a diagrammatic perspective view showing the arrangement of gearing and other mechanism for driving the work blank and cutter of a machine embodying the invention.

Figure 2 is a detail plan view of a cam element which may be used in the construction and;

Figure 3 is a detail view in section through the carriage of the machine.

The apparatus illustrated for the purposes of disclosure comprises a work shaft 5 to which may be secured a work blank 6, said work shaft being longitudinally reciprocable in a rotatable head 7. The cutter shaft 8 arranged to carry a cutter 9 in operative relation to the work blank 6 is rotatably mounted in the head 10 arranged to reciprocate longitudinally on suitable ways to carry the cutter 9 across the face of the work blank 6.

Suitable gearing is provided to rotate the work shaft 5 and cutter shaft 8 at appropriate relative speeds timed in accordance with the numbers of teeth on the cutter and the gear to be cut.

As shown power is received by a main shaft 14 from which through spiral gears 15, 16 is driven a transverse shaft 17 carrying a worm 18 to drive a worm wheel 19 fixed on the rotatable head 7. The cutter shaft 8 is driven in suitably timed relation through a train of gearing shown as comprising a shaft 20 driven from the shaft 14 by intermeshing gears 21, a shaft 22 driven from the shaft 20 by intermeshing bevel gears 23, 24, a shaft 25 driven from the shaft 22 through bevel gears 26, and a worm 27 splined on the shaft 25 for movement longitudinally thereof and driving a worm wheel 28 secured to the cutter shaft 8. When the cutter carrying head 10 reciprocates the worm 27 moves longitudinally of the shaft 25 but maintains its driving engagement with the worm wheel 28.

The cutter carrying head 10 is reciprocated by a cam 30 carried by a shaft 31 which in turn is driven from the shaft 14 through shafts 32, 33, 34 and 35 and the intermeshing gears maintaining driving connection. Any suitable means such as a spring, not shown, may be employed to maintain a projection 100 on the carriage against the periphery of the cam 30. In order to cut gears of different angles the cutter head 10 may be moved to different angular positions about any suitable axis, preferably one at or near the axis of the shaft 8 at some point in its bodily movement. To this end the head 10 is reciprocably mounted on suitable ways on a table 38 which table may be adjusted angularly to different positions, as by mounting the same on arcuate ways carried in a well known way on the main bed or frame of the machine. The arrangement of the several shafts and their driving connections is such as to maintain the proper driving relations in all of the various adjusted positions of the table. To this end the shafts 22, 25, 31 and 35 are carried in any suitable way by the table and are shifted therewith during angular adjustment of the table. Shaft 34, furthermore, is extensible so that as the shaft 35 is swung in an arc about the axis of adjustment of the table, the shaft 34 will either be extended or contracted to maintain the proper connection between the parts.

A special provision is made for the bevel gear 23 which is carried by and rotatable with the shaft 20 that is parallel to the shaft 14 and has no angular movement. This gear, as well as its co-operating gear 24 and the shaft 22, must be capable of linear movement in the direction in which the shaft 20 extends. For this purpose the gear 23 is provided with a sleeve 230 which is splined to the shaft 20 so as to be rotatable therewith but movable longitudinally thereof. The sleeve 230 is journalled in a bracket 231 which also has a vertically disposed bearing support 232 for the shaft 22. An extension 233 of the bracket is suitably connected by a swivel joint to a slide 381 slidable in suitable longitudinally extending ways on the underside of the table 38. Now, as the table 38 is adjusted angularly, the sleeve 230 and the supporting bracket 231 will slide along the shaft 20 and at the same time the slide 381 will move in or out on the table 38, as required, to permit the rectilinear movement of the gear 23 during the angular movement of the table. The swivelled connection between the extension 233 and the slide 381 permits the relative angling necessary between these parts. It will be understood that a suitable bracket or yoke serves to hold the gears 26 in mesh and that as the table is adjusted angularly the shaft 25 is carried with it and at the same time may shift longitudinally relative thereto along with the shaft 22, slide 381, etc. The splined connection between the worm 27 and the shaft 25 permits this longitudinal movement.

During the cutting operation the cutter head 10 reciprocates constantly across the face of the blank as actuated by the cam 30 and during each reciprocation it is desirable to give an additional rotary movement to the work shaft 5. This is accomplished in the arrangement shown by giving to the worm 18 a longitudinal movement to give in turn a partial rotation to the worm wheel 19. A cam 40 is positioned on the shaft 32 to engage the end of the shaft 17 for this purpose. During each return movement of the reciprocating cutter head it is desirable to retract the work blank or otherwise avoid engagement of the cutter and blank. In the arrangement shown the reciprocating head 10 is provided with a cam slot 42 which is engaged by a follower 43 to control a link 44 which in turn engages an arm 45 on a rock shaft 46 carrying a yoke 47 in engagement with a collar 48 controlling the longitudinal position of the work shaft 5. Referring more particularly to Figure 2, one suitable form which the cam slot 42 may assume is more clearly shown. It will be understood that the cam slot being carried by the head 10 is reciprocated therewith, on each rotation of the cam 30, in a direction parallel to the longer side of the rectangle formed by the slot. In order to enforce the movement of the follower 43 along the opposite sides of the central division member 430, a pair of slidable elements 431 and 432 are provided. These elements are urged by springs 433 into the positions shown. The element 431 has a cam portion 434 which extends into the plane of the follower 43. Now, it will be apparent that as the head 10 is shifted toward the left in Figure 2, after a cutting stroke, the follower 43 will be forced up the incline of the cam 434 and will ride in the groove on the upper side of the member 430. This will serve to withdraw the work from the path of the cutter and temporarily hold it out. When a cam portion 435 carried by the element 432 reaches the follower, the element will be forced toward the bottom of Figure 2 against the action of the spring 433 until the cam is cleared, at which time the spring will act to restore the slidable element. On the next cutting movement of the head 10, the cam 435 will force the follower into the lower groove of the cam 42 and near the end of this stroke the follower will force the slide 431 toward the top of Figure 2 until its cam is cleared and the parts assume the positions shown. Obviously, any other mechanism for enforcing movement of the follower 43 along opposite sides of the division member 430 during reciprocations of the head might be employed. For example, a spring might be used to normally urge the link 44 and connected parts in one direction and one of the slidable elements 431 or 432 might then be dispensed with.

To compensate for the movement of the cam slot 42 during the angular adjustment of the table 38 so that the work spindle will not be unduly shifted during such adjustment, the link 44 may be formed in two sections constituting an extensible connection. Elongated slots 441 provided in one section may co-operate with bolts on the other section while wing nuts 451, or similar devices, may be employed to clamp the two sections of the link together in any adjusted position. Any suitable means, such as guide lugs 440, carried by the frame of the machine, should be provided for guiding the end of the link 44 to maintain the latter substantially parallel to the work spindle. The position of the work shaft relative to the collar 48 may be further controlled by a hand feed arrangement comprising the hand wheel 50 on a screw 51 operating in the head 7. This hand feed arrangement may be used when the machine is in operation to feed the work further and further into the path of the cutter until the desired tooth depth has been reached.

A brief summary of a typical operation of the machine may now be given. A suitable gear blank is placed on the spindle 5 and a suitable cutter on the shaft 8 and the gearing between these shafts is properly selected to provide relative speeds of rotation in proportion to the teeth on the cutter and the teeth to be cut on the blank. The table 38 is adjusted angularly to correspond with the angle of the root cone of the gear to be cut. Link 44 is adjusted to compensate for the angular adjustment of the table and the hand wheel 50 is turned until the face of the blank is just brought into the path of the cutter as the latter is reciprocated and when the follower 43 is travelling in the cam groove below the member 430 in Figure 2. Now as the machine is set in operation the head or slide 10 will be reciprocated by the cam 30 at the desired cutting speed of the cutter 9. At the same time the work will be given a corresponding oscillatory movement by action of the cam 40 on the worm shaft 17. The combined movement of the cutter and work will cause a tooth on the cutter to follow the desired spiral tooth course on the face of the blank. On each return movement of the head 10 and return swing of the work in its oscillation the work will be withdrawn from the path of the cutter to permit idle return of the parts. In addition to the reciprocatory or oscillatory movements of the cutter and work these elements are constantly, and preferably rather slowly, rotated in timed and meshing relation about their axes, due to the gearing driven by the shaft 14, so that different tooth spaces on the work and different teeth on the cutter are brought into action. After a cut of a given depth has been taken all around the gear blank the latter may be fed forward a slight amount by the hand wheel 50 and the operation may be continued until the teeth have been cut to the desired depth due to the gradual feeding of the blank by the hand wheel. If desired the feeding of the blank may be effected automatically either continuously or intermittently by suitable gearing or other mechanism operated from the shaft 14 and serving to turn the feed screw 51.

The foregoing particular description is diagrammatic and illustrative merely and is not intended as defining the limits of the invention. Many changes may be made without departing from the general spirit and scope of the invention. While the cutter axis has been shown as substantially vertical and the work spindle as horizontal, the angular relation of these axes may well be modified.

I claim:

1. In a machine for generating spiral bevel gears the combination with means for supporting and constantly rotating a conical gear blank of means for supporting and constantly rotating a gear cutter in cutting relation to the gear blank and means for repeatedly moving the cutter bodily across the face of the blank at an acute angle to the axis of the latter during the relative rotation of the cutter and blank.

2. In a machine for generating spiral bevel gears the combination with means for supporting and constantly rotating a conical gear blank of means for supporting and constantly rotating a gear cutter in cutting relation to the gear blank, means for repeatedly reciprocating the cutter bodily across the face of the blank, means for simultaneously oscillating said blank and means for feeding the blank into cutting engagement with the cutter.

3. In a machine for generating gear teeth the combination of a work shaft arranged to carry a gear blank means for constantly rotating the work shaft, a cutter shaft, the axis of which lies at an angle to the work shaft, means for constantly rotating the work shaft and cutter shaft in predetermined timed relation, means for simultaneously oscillating the work shaft and means for causing a repeated relative reciprocating movement of the work shaft and cutter shaft to cut a gear.

4. In a machine for generating gear teeth the combination of a work shaft on which a gear blank to be cut may be fixed, a cutter shaft, means for constantly rotating the work shaft and cutter shaft in predetermined timed relation, means for repeatedly reciprocating the cutter shaft to carry a cutter relatively across the face of the blank and means operating in timed relation to the reciprocating means for giving an additional intermittent rotary movement to the work shaft.

5. In a machine for generating gear teeth in combination a work shaft, a cutter shaft, means for rotating said cutter shaft, means for driving the work shaft in timed relation with the rotation of said cutter, comprising a worm gear wheel, a worm rotatable to drive said worm wheel and means for intermittently reciprocating said worm to give an additional rotary movement to said worm wheel.

6. In a machine for generating gear teeth in combination a work shaft, a cutter shaft, means for rotating said cutter shaft, actuating means for said work shaft operating in timed relation with said cutter rotating means comprising a worm wheel, a worm rotatable to actuate said worm wheel and a cam means for intermittently reciprocating said worm to give an additional rotary movement to said worm wheel.

7. In a machine for generating gear teeth in combination a work shaft, a cutter shaft actuating means for simultaneously rotating said work shaft and cuter shaft, means for repeatedly moving said cutter shaft reciprocably to carry the cutter across the face of the work and means for retracting said work shaft longitudinally during the return movement of the cutter shaft.

8. The method of cutting bevel gears which comprises continuously reciprocating a toothed cutter across the face of a blank at an acute angle to the axis of the blank, simultaneously continuously rotating the blank and cutter, and producing a relative feeding movement between the work blank and the cutter axis.

9. The method of cutting bevel gears which comprises reciprocating a toothed cutter across the face of a blank at a cutting speed in a direction forming an acute angle with the axis of the blank, simultaneously rotating the blank and cutter in a meshing relation, and producing a relative feeding movement between the blank and cutter axis.

10. The method of cutting bevel gears which comprises reciprocating a toothed cutter across the face of a blank at a cutting speed, simultaneously rotating the blank and cutter in a meshing relation, and oscillating said work blank in timed relation with the reciprocations of said cutter.

11. The method of cutting bevel gears which comprises continuously reciprocating a toothed cutter across the face of a blank while maintaining the face of said cutter in the same plane, and simultaneously continuously rotating the blank and cutter.

12. The method of cutting bevel gears which comprises continuously reciprocating a toothed cutter across the face of a blank, the axis of said cutter having a rectilinear movement at an angle to the direction in which it extends, and simultaneously continuously rotating the blank and cutter at intermeshing speeds.

13. The method of cutting spiral bevel gears which comprises reciprocating a toothed cutter at a cutting speed across the face of a blank, while maintaining the face of said cutter in the same plane, and simultaneously oscillating the blank to cause a tooth of the cutter to follow a desired spiral path on the face of the blank.

14. The method of cutting spiral bevel gears which comprises reciprocating a toothed cutter at a cutting speed across the face of a blank, while maintaining the face of said cutter in the same plane, simultaneously oscillating the blank to cause a tooth of the cutter to follow a desired spiral path on the face of the blank, and continuously rotating the cutter and blank at intermeshing speeds.

15. The method of cutting spiral bevel gears which comprises reciprocating a toothed cutter at a cutting speed across the face of a blank, while maintaining the face of said cutter in the same plane, and simultaneously oscillating the blank to cause a tooth of the cutter to follow a desired spiral path on the face of the blank, continuously rotating the cutter and blank, and gradually producing a relative feeding movement between the blank and the cutter axis.

In testimony whereof, I have signed my name to this specification this 10th day of March, 1930.

LINUS E. GREENE.